United States Patent [19]
Heber et al.

[11] Patent Number: 6,137,257
[45] Date of Patent: Oct. 24, 2000

[54] METHOD FOR MONITORING THE POSITION OF A SWITCHED RELUCTANCE MOTOR

[75] Inventors: Brian Paul Heber, Delaware, Ohio; Scott Alan Horning, Louisville, Ky.; Andrew Karl Zup, Dayton, Ohio

[73] Assignee: Delphi Technologies, Inc., Troy, Mich.

[21] Appl. No.: 09/302,889

[22] Filed: Apr. 30, 1999

[51] Int. Cl.[7] .................................. H02P 6/16; H02P 8/00
[52] U.S. Cl. ............................................. 318/701; 318/254
[58] Field of Search .................................... 318/138, 254, 318/437, 439, 700, 701, 721, 724

[56] References Cited

U.S. PATENT DOCUMENTS

| | | |
|---|---|---|
| 4,520,302 | 5/1985 | Hill et al. . |
| 4,670,696 | 6/1987 | Byrne et al. . |
| 5,010,267 | 4/1991 | Lipo et al. . |
| 5,107,195 | 4/1992 | Lyons et al. ............................ 318/701 |
| 5,140,243 | 8/1992 | Lyons et al. ............................ 318/701 |
| 5,140,244 | 8/1992 | Lyons et al. ............................ 318/701 |
| 5,296,793 | 3/1994 | Lang . |

*Primary Examiner*—Bentsu Ro
*Attorney, Agent, or Firm*—Robert M. Sigler

[57] ABSTRACT

A method for monitoring motor position in a multiple phase switched reluctance motor having phase windings which are energized by a controller involves producing a signal indicative of a current delivered to an active phase winding and producing a signal indicative of a voltage across the active phase winding. A flux linkage associated with the active phase winding is then established based at least in part upon the current indicative signal and the voltage indicative signal. A position of the motor is then estimated based at least in part upon the current indicative signal and the established flux linkage.

2 Claims, 7 Drawing Sheets

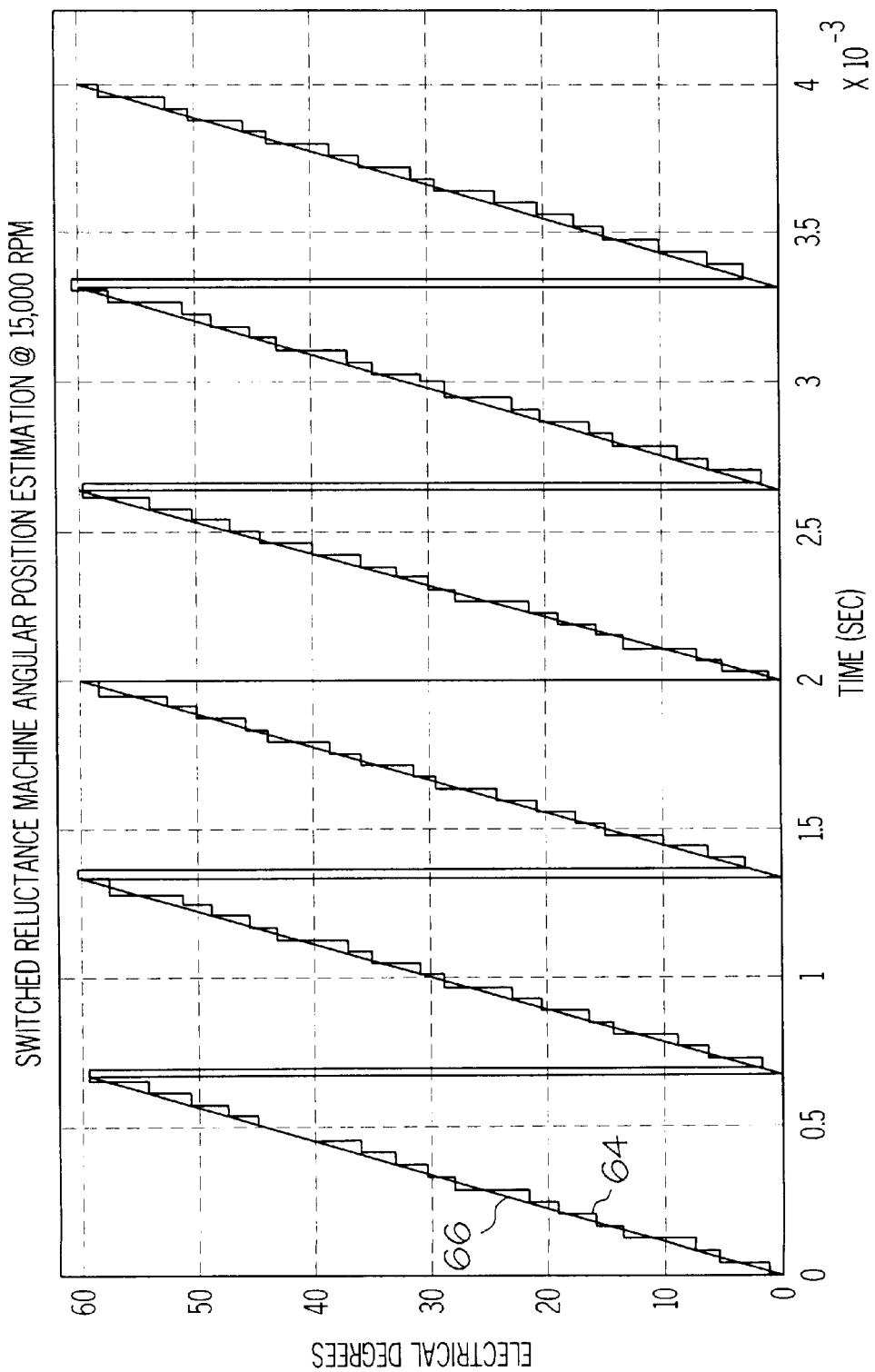

6,137,257

METHOD FOR MONITORING THE POSITION OF A SWITCHED RELUCTANCE MOTOR

TECHNICAL FIELD

This invention relates generally to switched reluctance motors, and more particularly to a method for monitoring the motor position without the need for standard motor position sensors.

BACKGROUND OF THE INVENTION

Commutation control in a switched reluctance motor is typically established based upon motor position. For example, phase advance control may be utilized to advance the commutation with increasing motor speed so that the build up of current in the phase windings tracks the peak inductance of the machine's magnetic circuit, optimizing operating efficiency over a wide speed range. One common technique of monitoring the motor position is to utilize rotary position sensors such as encoders. However, such standard rotary position sensors are not as robust as the motor and the other electronics and therefore can be a significant failure point, compromising overall system durability. Further, the position sensor and the associated electronics add to the cost and size of the motor. Previous attempts to eliminate standard rotary position sensors included injecting current into inactive phase windings and then measuring the rise and decay of the current to determine inductance. Based upon knowledge of the inductance versus position, a motor position could then be estimated. These methods involved several major drawbacks including requiring additional hardware to turn on and off the inactive phase windings, neglecting magnetic saturation, neglecting back EMF effects, and limiting the speed of the motor due to the time required to probe an inactive phase winding.

SUMMARY OF THE INVENTION

The present invention is a method for monitoring motor position in a multiple phase switched reluctance motor without requiring the use of traditional rotary position sensors and without requiring significant additional hardware, In one aspect of the present invention a method for monitoring position of a rotor in a multiple phase switched reluctance motor having stator phase windings which are energized by a controller involves producing a signal indicative of a current delivered to an active phase stator winding and producing a signal indicative of a voltage across the active phase stator winding. A flux linkage associated with the active phase stator winding is then established based at least in part upon the current indicative signal and the voltage indicative signal. A position of the rotor is then estimated based at least in part upon the current indicative signal and the established flux linkage.

In another aspect of the invention a method for estimating a motor position of a multiple phase switched reluctance motor having phase windings which are energized by a controller, without requiring use of a motor position sensor, involves determining a current level delivered to a first phase winding while active and determining a voltage level across the first phase winding while active. A flux linkage associated with the first phase winding is established based at least in part upon the determined current level and the determined voltage level. The motor position is then estimated based at least in part upon the determined current level and the established flux linkage.

The present invention enables the motor position to be monitored and utilized for a variety of purposes, including commutation of the phase windings, without requiring the inclusion of traditional rotary position sensors such as encoders. Eliminating such traditional rotary position sensors reduces the costs associated with switched reluctance motors and also eliminates a potential failure point of such switched reluctance motors. Further, unlike previous attempts at eliminating traditional rotary position sensors, the present invention takes into account factors such as magnetic saturation and back EMF effects. In many switched reluctance motors no additional hardware will be necessary to implement the inventive method. Further, the inventive method can be practiced at high speeds, only limited by the speed ratings of the microcontroller, microprocessor or other processing device utilized in the controller.

Accordingly, it is an object of the present invention to provide a simple method of determining the angular position of a multiple phase switched reluctance motor, a method of eliminating a need for traditional rotary position sensors in a multiple phase switched reluctance motor, and a switched reluctance motor having reduced cost.

BRIEF DESCRIPTION OF THE DRAWINGS

FIGS. 5A and 5C are graphs of angular motor position as estimated in the present invention as compared to actual motor position.

DESCRIPTION OF THE PREFERRED EMBODIMENT

Figure 1:
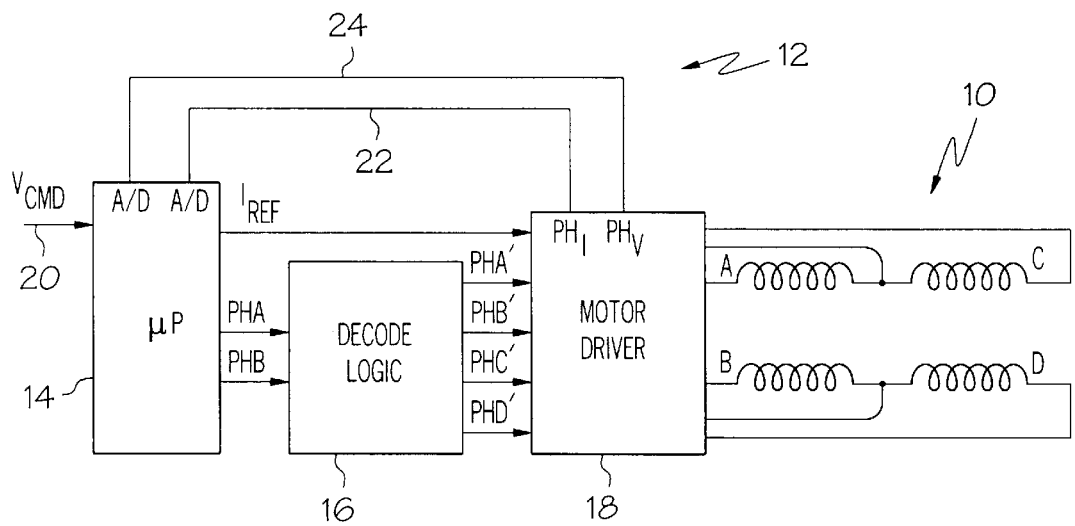
FIG. 1 is a schematic representation of a multiple phase switched reluctance motor and associated motor controller adapted for the present invention.
Figure 2A:
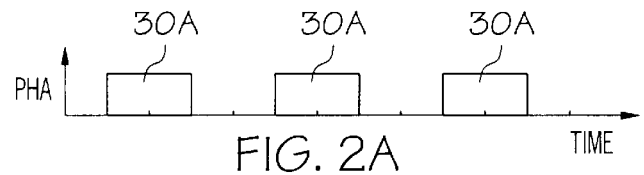
FIGS. 2A, 2B, 2C, and 2D show a multi-graph timing diagram for the four phase windings of the switched reluctance motor of FIG. 1.
Figure 2B:
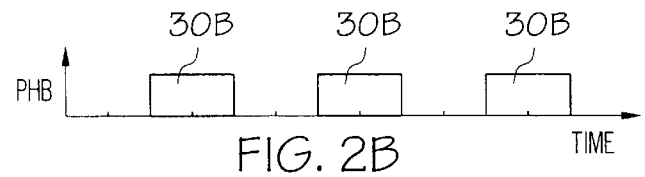
Figure 2C:
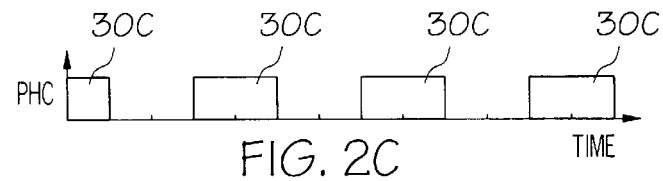
Figure 2D:
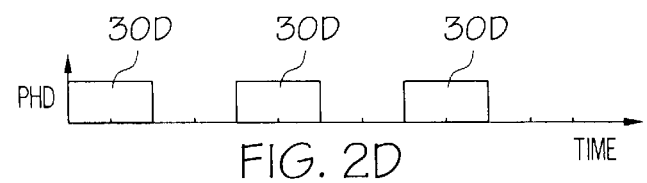

Referring to the drawings, and particularly to FIG. 1, the reference numerals 10 and 12 respectively designate a four-phase switched reluctance machine, and a microprocessor based controller for controlling the operation of the machine. The controller 12 includes a microprocessor 14, decode logic circuitry 16 and a motor driver circuit 18. The phase windings A–D are interconnected as shown so that both terminals of each winding are coupled to the driver circuit 18. The microprocessor receives a velocity command input $V_{cmd}$ on line 20, and current and voltage signals on lines 22 and 24. In particular, a current indicative signal for an active phase winding is provided on line 22 and a voltage indicative signal for the active phase winding is provided on line 24. Each of such signals is provided to an A/D converter of the microprocessor 14.

The microprocessor 14 regulates the motor speed at the commanded value $V_{cmd}$ and schedules the commutation control signals for the motor phase windings A–D. The motor speed is regulated through the use of a conventional current control loop, in which the microprocessor 14 generates a current command $I_{ref}$ for motor driver circuit 18 based upon a determined speed error. The driver circuit 18, in turn, compares the current command $I_{ref}$ with a measure of the actual winding current, and modulates or chops the voltage applied to the respective winding at a duty cycle based on a determined current error.

The scheduling of commutation is carried out by generating a pair of commutation control signals PHA and PHB. The commutation control signals PHA and PHB are established according to the motor position which is estimated by the microprocessor 14 based upon the current and voltage signals received on lines 22 and 24 as explained in more detail below. The signals PHA and PHB are applied to the decode logic circuit 16, which develops individual commutation control signals PHA', PHB', PHC', and PHD' for each of the phase windings, such signals being applied to the motor driver circuit 18. Thus, the motor driver circuit 18 is operative to enable and disable the energization of each of the phase windings based on the commutation signals PHA'-PHD', and to modulate the application of voltage to the winding within the respective energization periods to regulate the winding current at the reference value $I_{ref}$.

Importantly, the microprocessor 14 is capable of estimating the motor position based upon the current and voltage signals received on lines 22 and 24, eliminating the need for traditional motor position sensors such as encoders. Although only one current line 22 is shown and only one voltage line 24 is shown, it is recognized that a current line and voltage line will typically be provided for each of the phase windings present in the motor.

Thus, in the motor 10, line 22 is representative of four distinct lines corresponding to the four phase windings A–D and line 24 is representative of four distinct lines corresponding to the four phase windings A–D. Providing distinct lines for each phase winding permits the motor position to be more accurately monitored/estimated throughout the entire rotation of the motor. However, it is also recognized that in certain applications, such as steady-state applications, a motor incorporating the present invention could be provided with current and voltage lines 22 and 24 for less than all of the phase windings of the motor 10.

Referring to FIGS. 2A–2D, the state of each phase winding is represented by a series of graphs on a common time base, assuming a constant motor speed. Alternatively, the horizontal axis of the various graphs can be viewed as representing motor position. The various phase windings are considered active during the time periods identified as 30A, 30B, 30C and 30D, respectively. Notably, phase winding A and phase winding C are 180° out of phase and phase winding B and phase winding D are likewise 180° out of phase. The present invention involves monitoring an active state of a phase winding to determine motor position based upon the current and voltage delivered to the phase winding during such active phase.

Figure 3:
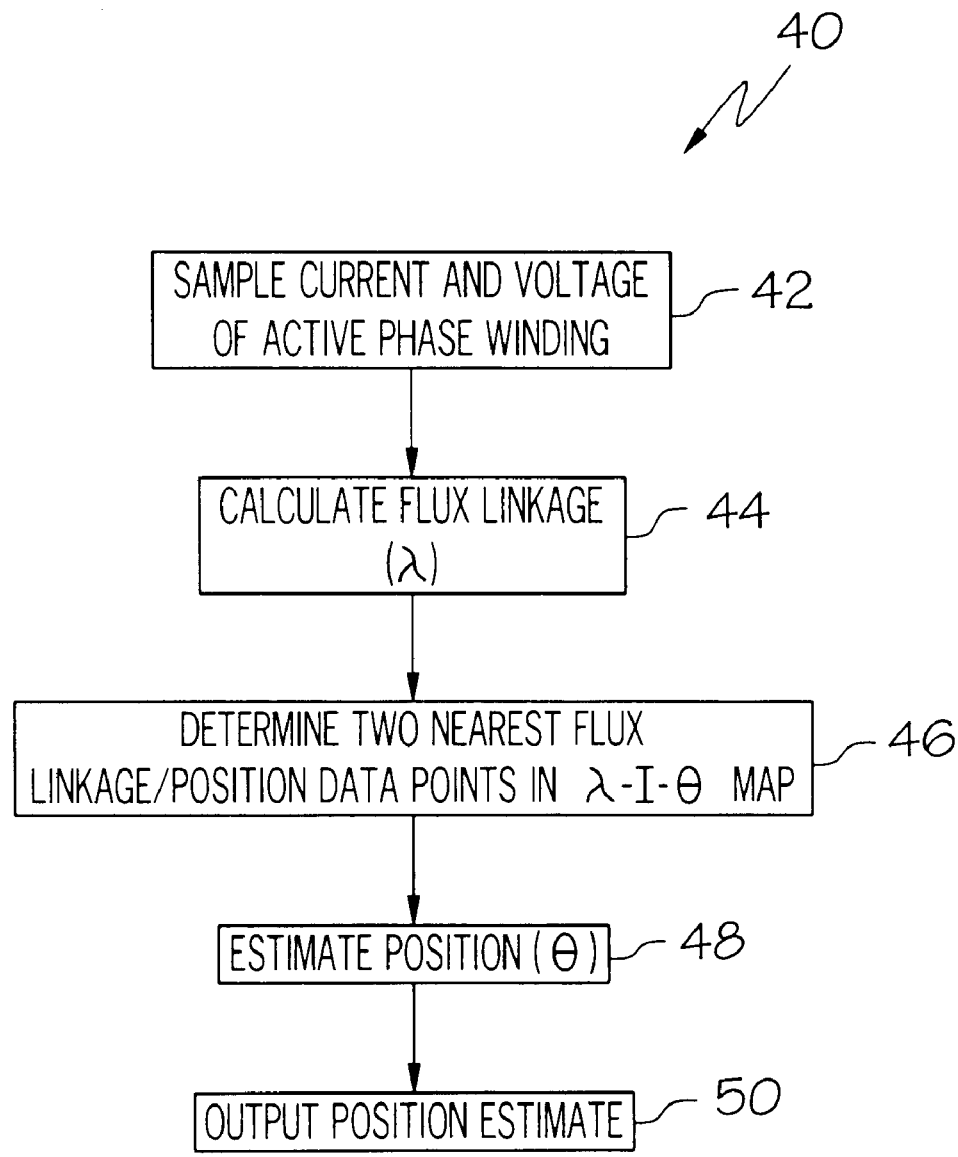
FIG. 3 is a high level flowchart of the steps of the present invention.

FIG. 3 represents a high level flow chart 40 of the operation of the microprocessor in carrying out the motor position monitoring technique of the present invention. The following discussion assumes analysis of phase winding A when active, but it is recognized and understood that the same description applies to position monitoring based upon any of the other phase windings when active. The motor driver 18 produces signals indicative of the current delivered to active phase winding A and the voltage delivered to active phase winding A on lines 22 and 24, respectively. At block 42 the microprocessor samples the current and voltage signals of active phase winding A, converting the signals to digital current (i) and voltage (V) values which can then be processed. At block 44, microprocessor calculates the flux linkage of the active phase winding A based upon the current and voltage values attained in block 42. In this regard, the flux linkage can be calculated utilizing the following equation:

$$\lambda = \int (V-iR)dt \quad (1)$$

Where ($\lambda$) is the flux linkage, where (V) is the voltage value, where (I) is the current value, and where (R) is a known resistance of the active phase winding A. The flux linkage calculation equation converts to the transform equation set forth below which can be carried out by the microprocessor 14.

$$\lambda(k) = \Delta t(V-iR) + \lambda(k-1) \quad (2)$$

Figure 4:
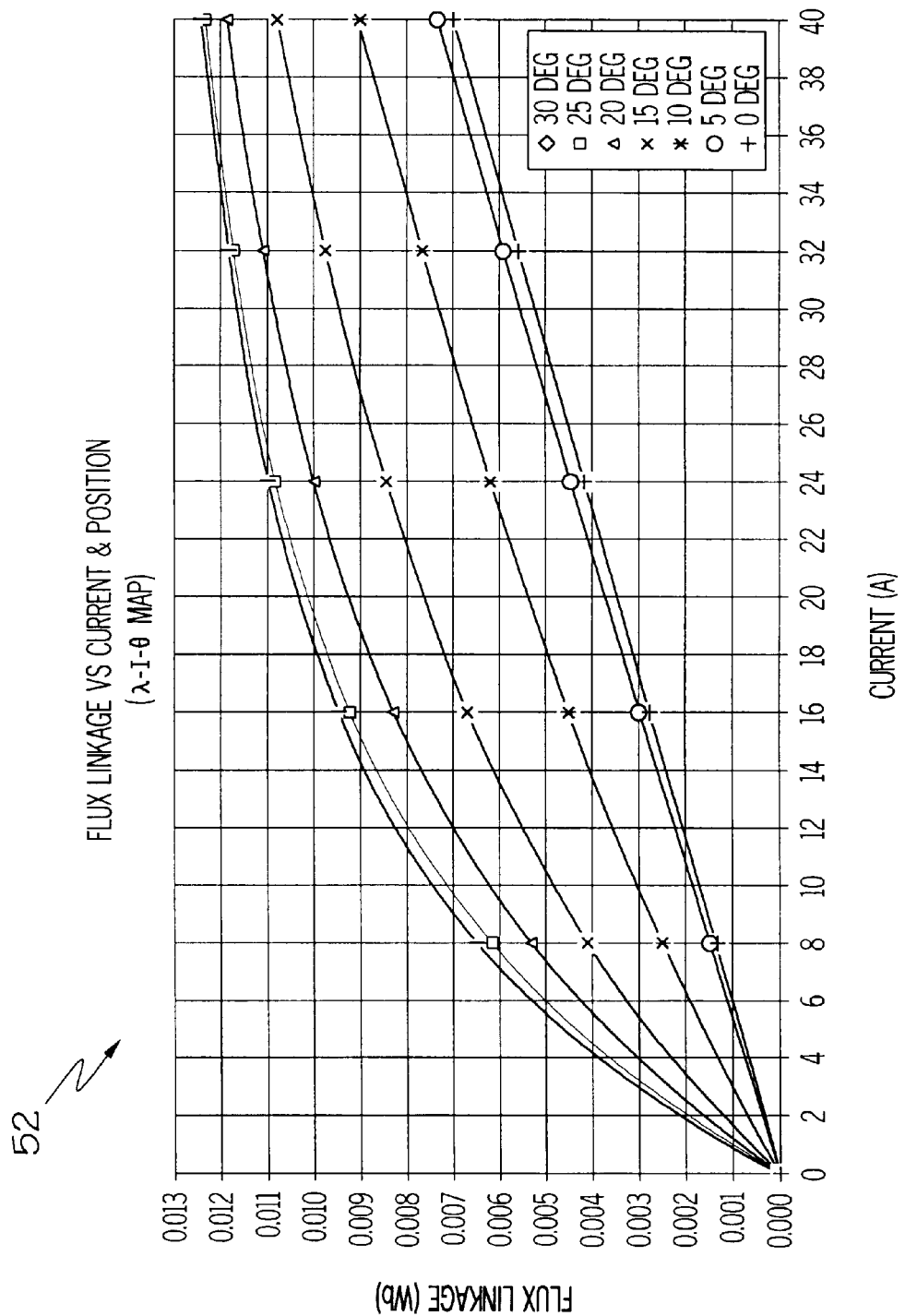
FIG. 4 is a map of flux linkage as a function of current for a plurality of motor positions.

Once the flux linkage ($\lambda$) is calculated, the motor position can then be estimated as explained below with reference to blocks 46 and 48 based upon known parameters of the particular reluctance motor being utilized. In this regard, reference is made to FIG. 4 showing a map 52 of flux linkage as a function of current for a plurality of motor positions, namely, 0, 5, 10, 15, 20, 25, and 30 degrees. Such map 52 is stored in memory associated with the microprocessor, enabling the microprocessor to access such data. In representative map 52, flux linkage/position data points are stored for currents at 8, 16, 24, 32, and 40 amps. The lines of such map merely represent curve fits.

Referring again to flow chart 40 of FIG. 3, at block 46 the microprocessor searches the database for the two flux linkage/position data points of the map which are nearest a hypothetical point on the map established by the flux linkage ($\lambda$) calculated at block 44 and the current value obtained at block 42. The actual motor position can then be estimated based upon the two flux linkage/position data points retrieved at 46 utilizing any suitable scheme such as a double interpolation with weighted average scheme. The position estimated is then output at 50 for use by the microprocessor 14 in establishing any desired commutation scheme, or for any other desired use.

Figure 5A:
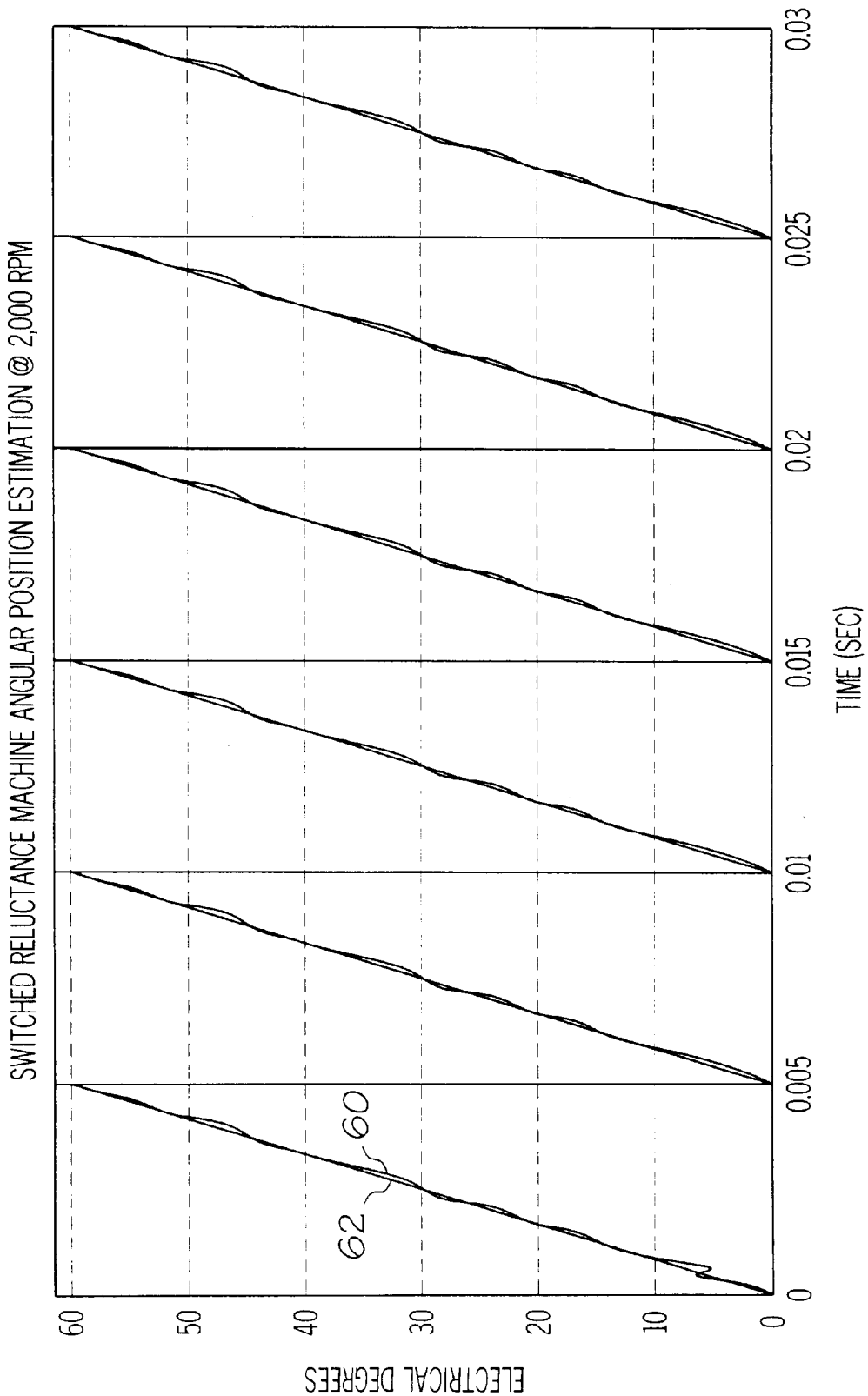
Figure 5B:
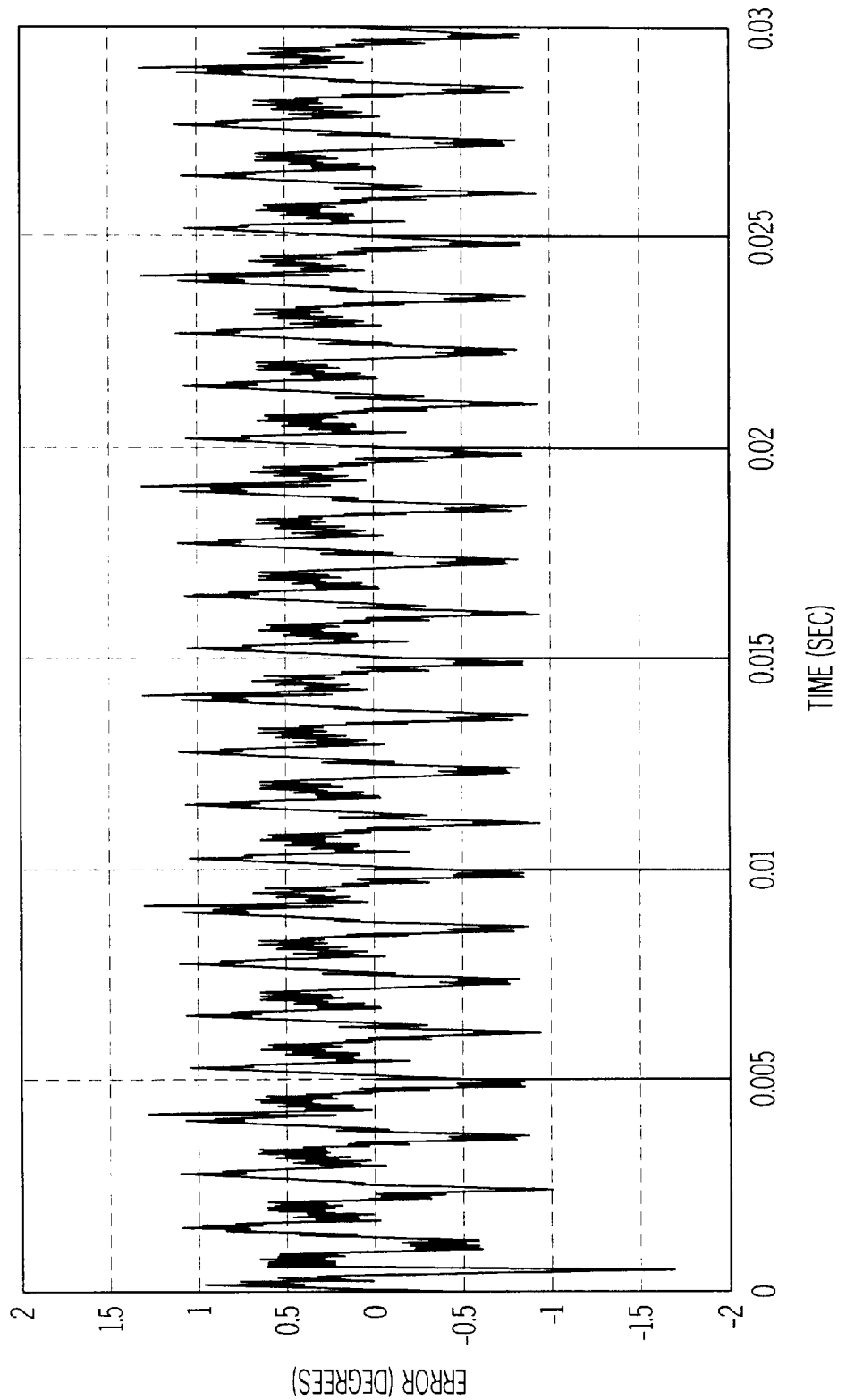
FIGS. 5B and 5D are angular error graphs corresponding respectively to graphs 5A and 5C.
Figure 5D:
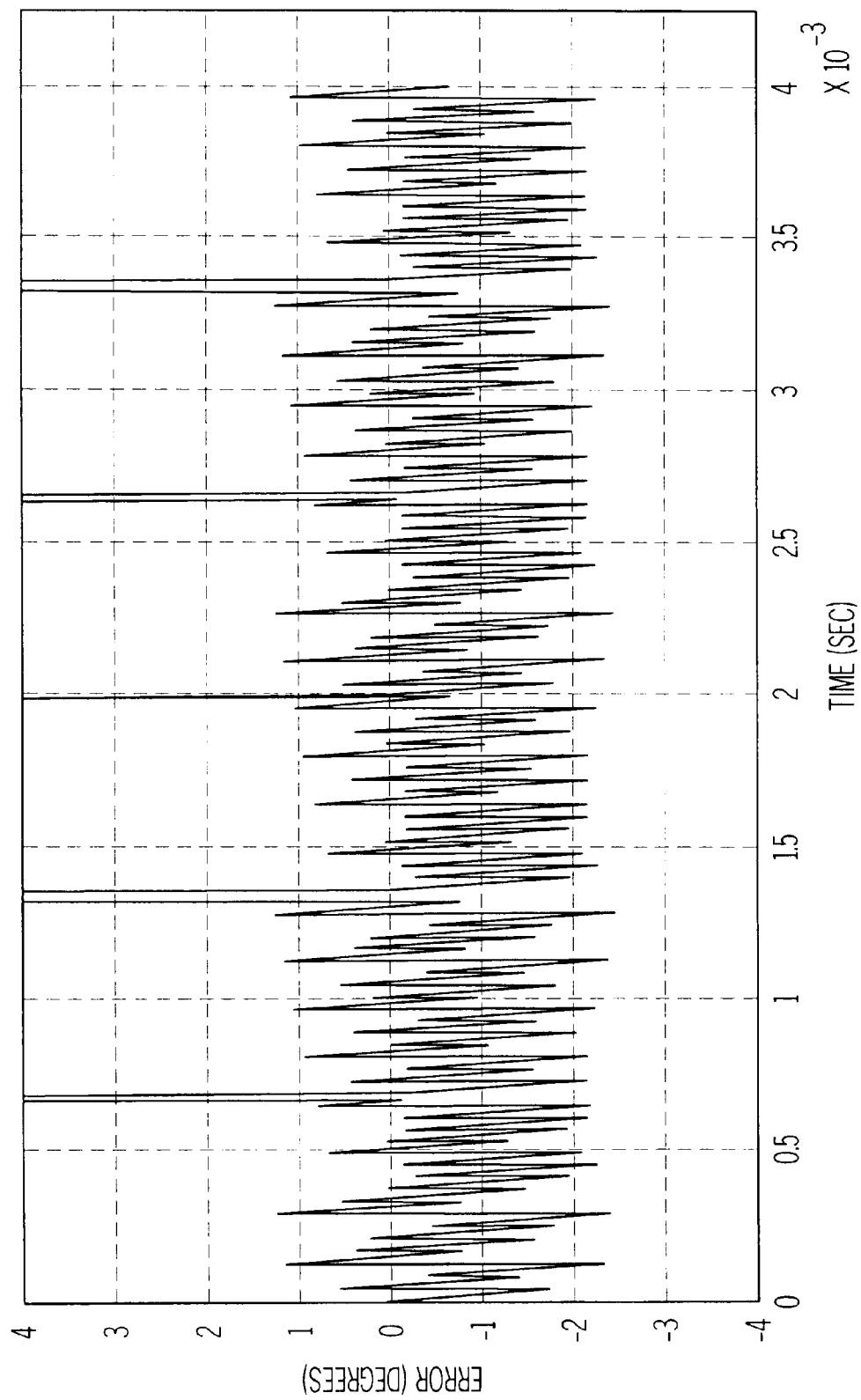

Referring again to FIG. 4, the map 52 may be established by computer simulation. Additional data points could be provided in the map 52. For example, data points for currents at 4, 12, 20, 28, and 36 amps could be provided, and data points for positions every 1, 2, 3, or 4 degrees could likewise be provided. However, as demonstrated by FIGS. 5A–5D, representative map 52 has been determined to provide suitable position estimation. FIG. 5A depicts a graph of angular position estimation at a motor speed of 2,000 rpm and FIG. 5C depicts a graph of angular position estimation at a motor speed of 15,000 rpm. At the lower speed of 2,000 rpm, the estimation curve 60 is hardly discernable from the actual motor position curve 62 while at the higher speed the estimated motor position curve 64 varies more greatly from the actual motor position curve 66. However, as shown by the error graphs of FIG. 5B and 5D, in both cases the estimated motor position continually falls within 1.5 degrees of the actual motor position. Thus, the estimation scheme of the present invention is shown to provide satisfactory information for many purposes, including establishing commutation. However, it is recognized that applications of the present invention having an accuracy less than or greater than that represented by the error graphs of FIGS. 5B and 5D still fall within the intended scope of the invention.

Advantageously, the motor position estimation method of the invention takes into account back EMF because sampling or measuring the voltage applied across the active phase winding inherently accounts for any back EMF effect. Further, use of the table takes into account any saturation effect. The method of the present invention also enables traditional rotary position sensors to be eliminated if desired.

The method of the present invention also has application in accounting for variations in the motor operating characteristics. For example, referring to equation 2 above, note that as the current (i) in a particular phase approaches zero the flux generated should similarly approach zero and thus λ(k) should also approach zero. If λ(k) is repeatedly calculated for a given phase winding and the value does not return to zero, one possible reason is that the resistance value (R) being utilized in the calculation is wrong. This change in resistance could be caused by a change in temperature of the motor. Accordingly, if the calculated λ(k) value does not return to within a threshold range of zero, the resistance value (R), which may be stored in the controller memory, can be adjusted to account for the change. In another use, the fact that the calculated λ(k) value does not return to within a threshold range of zero could be utilized as a warning system indicating that the temperature of the motor has reached an unsafe level, and the motor could be shut down. Alternatively, the actual value of λ(k) when it should be zero could be used to estimate the motor temperature.

While the forms of the apparatus and method herein described constitute preferred embodiments of the invention, it is to be understood that the invention is not limited to these precise forms, and changes may be made therein without departing from the scope of the invention.

What is claimed is:

1. A method for estimating a motor position of a multiple phase switched reluctance motor having phase windings which are energized by a controller, without requiring use of a motor position sensor, the method comprising the steps of:

(a) determining a current level delivered to a first phase winding while active;

(b) determining a voltage level across the first phase winding while active;

(c) establishing a flux linkage associated with the first phase winding based at least in part in accordance with the equation:

$$\lambda = \int (V - iR) dt$$

where ($\lambda$) is the flux linkage of the first phase winding;
    where (V) is the determined voltage level of step (b);
    where (i) is the determined current level of step (a); and
    wherein (R) is a known resistance of the first phase winding stored in memory associated with the controller;

(d) estimating the motor position based at least in part upon the current level determined in step (a) and the flux linkage established in step (c);

(e) monitoring whether the calculated flux linkage ($\lambda$) for the first phase winding falls within an established threshold range about zero after the current delivered thereto falls to zero; and (f) initiating a control response if the calculated flux linkage ($\lambda$) for the first phase winding does not fall within the established threshold range about zero after the current delivered thereto falls to zero by adjusting the stored (R) value.

2. A method for estimating a motor position of a multiple phase switched reluctance motor having phase windings which are energized by a controller, without requiring use of a motor position sensor, the method comprising the steps of:

(a) determining a current level delivered to a first phase winding while active;

(b) determining a voltage level across the first phase winding while active;

(c) establishing a flux linkage associated with the first phase winding based at least in part in accordance with the equation:

$$\lambda = \int (V - iR) dt$$

where ($\lambda$) is the flux linkage of the first phase winding;
    where (V) is the determined voltage level of step (b);
    where (i) is the determined current level of step (a); and
    where (R) is a known resistance of the first phase winding;

(d) estimating the motor position based at least in part upon the current level determined in step (a) and the flux linkage established in step (c);

(e) monitoring whether the calculated flux linkage ($\lambda$) for the first phase winding falls within an established threshold range about zero after the current delivered thereto falls to zero; and (f) initiating a control response if the calculated flux linkage ($\lambda$) for the first phase winding does not fall within the established threshold range about zero after the current delivered thereto falls to zero, wherein the control response includes estimating a temperature of the motor.

\* \* \* \* \*